US012567075B2

(12) United States Patent
Herrera et al.

(10) Patent No.: US 12,567,075 B2
(45) Date of Patent: Mar. 3, 2026

(54) METHOD OF SCORING AND VALUING DATA FOR EXCHANGE

(71) Applicant: Drumwave Inc., Palo Alto, CA (US)

(72) Inventors: Santiago Ortiz Herrera, Palo Alto, CA (US); André Gustavo Vellozo Luz, Palo Alto, CA (US); Javier Cruz San Martin, Palo Alto, CA (US)

(73) Assignee: Drumwave Inc., Palo Alto, CA (US)

(*) Notice: Subject to any disclaimer, the term of this patent is extended or adjusted under 35 U.S.C. 154(b) by 536 days.

(21) Appl. No.: 17/406,960

(22) Filed: Aug. 19, 2021

(65) Prior Publication Data

US 2022/0058658 A1 Feb. 24, 2022

Related U.S. Application Data

(60) Provisional application No. 63/117,718, filed on Nov. 24, 2020, provisional application No. 63/067,728, filed on Aug. 19, 2020.

(51) Int. Cl.
*G06Q 30/018* (2023.01)
*G06F 16/215* (2019.01)
*G06N 20/00* (2019.01)

(52) U.S. Cl.
CPC ......... *G06Q 30/018* (2013.01); *G06F 16/215* (2019.01); *G06N 20/00* (2019.01)

(58) Field of Classification Search
CPC ....... G06N 20/00; G06F 16/25; G06Q 30/018
See application file for complete search history.

(56) References Cited

U.S. PATENT DOCUMENTS 10,339,147 B1 * 7/2019 Barmes ................... G06N 5/046
11,321,286 B1 * 5/2022 Mooney .............. G06F 16/2365
(Continued)

FOREIGN PATENT DOCUMENTS

CN 103309869 A * 9/2013

OTHER PUBLICATIONS

Chinese Patent Publication (Year: 2020).*
(Continued)

*Primary Examiner* — Beth V Boswell
(74) *Attorney, Agent, or Firm* — Pillsbury Winthrop Shaw Pittman LLP

(57) ABSTRACT

A system and method for valuing a plurality of sets of data and similar medium, comprising receiving datasets, creating a first sub-score for each of the datasets, creating a second numerical sub-score for each of the plurality of datasets, the second numerical value varying based on information characteristics, the second sub-score being larger for improved information characteristics characterized by one or more of increased structural quality, increased completeness, increased interconnectivity, increased diversity, decreased redundancy, creating a third sub-score for each of the plurality of datasets, the third sub-score comprising a third numerical value being larger for improved meaning characteristics characterized by one or more of increased impact on a community, an increased number of impacted communities, greater veracity, greater relevance to an impacted community, greater scarcity; creating a composite score for each of the plurality of datasets that is a mathematical combination of the first, second, and third sub-scores.

18 Claims, 2 Drawing Sheets

100

Connect Data and Extract Data — 101

Run metadata extractor Algorithm — 102

Register Data — 103

Calculate DIM Score — 104

Certificate for Data Set — 105

Generate Report for Data Asset — 106

(56)  References Cited

U.S. PATENT DOCUMENTS

2012/0232960 A1 * 9/2012 Smith ................... G06Q 10/00
                                                 705/7.35
2018/0349508 A1 * 12/2018 Bequet ................. G06F 18/217
2021/0092160 A1   3/2021 Crabtree et al.

OTHER PUBLICATIONS

Extended European Search Report as issued in European Patent Application No. 22191104.3, dated Jan. 3, 2023.
Examination Report as issued in corresponding Indian Patent Application No. 202244047239, dated Feb. 2, 2024.

* cited by examiner

101

102

103

104

105

106

Connect Data and Extract Data

Run metadata extractor Algorithm

Register Data

Calculate DIM Score

Certificate for Data Set

Generate Report for Data Asset

100

METHOD OF SCORING AND VALUING DATA FOR EXCHANGE

CROSS-REFERENCE TO RELATED APPLICATIONS

This application claims priority of U.S. Provisional Application No. 63/067,728, filed Aug. 19, 2020, entitled "DATA VALUATION SYSTEM AND METHOD," and U.S. Provisional Application No. 63/117,718, filed Nov. 24, 2020, entitled "METHOD OF SCORING AND VALUING DATA FOR EXCHANGE." The contents of these applications are incorporated herein by reference in their entirety.

BACKGROUND

Field

This invention is in the field of valuation of data and more specifically methods for creating exchangeable datasets through valuations.

Description of the Related Art

Data gathering, querying and qualification can be used to by merchants, academics, data scientists, and others interested in understanding a number of different purposes, including data relationships, anticipation of likelihood of events, commercial exploitation, and otherwise.

Data is captured and compiled for use under any number of different methods. Among these methods is a system of traditional capture by individual entities to exploit the data itself or by professional entities that market to commercial entities for exploitation, such as consumer research firms and their product-maker clients. These methods tended to be too cordoned off from potential or larger exchanges. The limited availability of the data to other entities that may have use for the data, some even beyond the contemplation of the entity selling the information, prevents data from being used as its highest value. Present techniques do not allow for systematic gathering, scoring, valuating, and exchanging data in a wide-ranging and efficient market.

SUMMARY

The following is a non-exhaustive listing of some aspects of the present techniques. These and other aspects are described in the following disclosure.

Certain aspects of the disclosure herein include a method for valuing a dataset comprising: receiving, by one or more processors, from a data wrangler, a dataset, the dataset comprising a plurality of entries and a plurality of dimensions associated with each of the plurality of entries; scoring, by one or more processors, the dataset based on the plurality of dimensions, the scoring having an objective and subjective component, the scoring producing a score; wherein the objective component comprises features such as the data size and measure of a plurality of information and the subjective component comprises a valuation based on a subjectively identifiable feature of the dataset or dimensions of the dataset, or other subjective relationship such as the relation between the dataset and the external environment, such subjective components including accuracy, scarcity, and relevance of the data; wherein at least one of the subjective components is registered by a data wrangler which can produce a score; and wherein the score is the result of a mathematical combination of at least the objective component and the subjective component; certifying, by one or more processors, the scoring of the dataset, the certifying producing a certification indicative of certain task completion by the wrangler, including by example review by a data wrangler, completion of automated tasks, and certification of completion of the wrangler's process; and presenting, to a user on a user device, a score and a certification associated with a dataset.

FIGURES

The above-mentioned aspects and other aspects of the present techniques will be better understood when the present application is read in view of the following figures in which like numbers indicate similar or identical elements.

Figure 1:
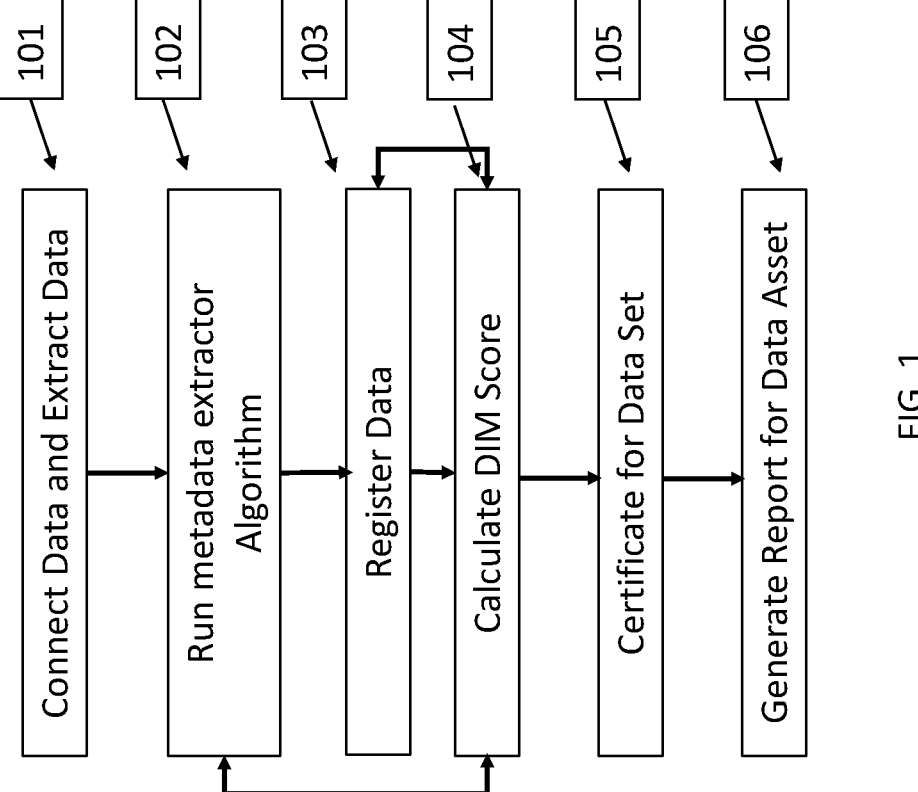
FIG. 1 is a flow of steps under certain embodiments for the calculation of a data valuation score under the teachings herein.

While the invention is susceptible to various modifications and alternative forms, specific embodiments thereof are shown by way of example in the drawings and will herein be described in detail. The flowcharts are not necessarily the only steps, the only order of the steps, or the steps required in each embodiment. The drawings may not be to scale. It should be understood, however, that the drawings and detailed description there to are not intended to limit the invention to the particular form disclosed, but to the contrary, the intention is cover all modifications, equivalents, and alternatives falling within the spirit and scope of the present invention as defined by the appended claims.

DETAILED DESCRIPTION

The above-described problems with traditional data exchange systems and others are mitigated by aspects of embodiments described herein. But it should be appreciated that some embodiments address only a subset of these problems or other problems apparent to those of skill in the art upon reading the present disclosure. Indeed, as explained in the concluding paragraphs of this specification, the present disclosure includes a number of independently useful inventions.

Certain embodiments include a method and system for valuing datasets. Under the teachings herein, datasets are provided with valuations or scores that can be fixed to the dataset for use in exchange. Data used herein can be created and accumulated for numerous purposes and reutilized and exchanged for various other purposes.

In some aspects, one or more datasets is loaded into a database accessible and manipulatable by one or more microprocessors. Datasets can have a plurality of data fields or dimensions, and can include zero, one, or more inputs for each dimension for each dataset or datasets. The datasets in this teaching can include any types of data.

In many embodiments, the datasets will be too large to be conveniently manipulated by humans, including datasets of thousands, millions, and billions of entries. In these embodiments, some or all of the aspects included herein are executable and performed by processors. In certain other embodiments, certain of the aspects included herein are performed by one or more humans and certain are performed by processors.

In certain other embodiments, the aspects taught herein are additive and performed in part by a human, and later or in a separate iteration by a processor, or vice versa. Certain embodiments of the present disclosure include the provisioning of one or more exchange platforms for the transfer of data certified under the processes described herein.

According to certain aspects of this present disclosure, a dataset can be received through an API (application programming interface) serving as an intermediary between one or more caches, data storage units, instruments, or otherwise and user devices used by one or more data wranglers, and networked with user devices used by one or more end users.

In embodiments, a plurality of users of a data exchange platform or service may exchange data or exchange currency, products, or services for data. Such exchanges may occur between a secure host server and a plurality of user computers across a network (e.g. the Internet or locally networked computers) in a secure manner, such as computers that have been authenticated and authorized, or having been given ad hoc rights to the network.

In certain embodiments, the user computers may interface with the network through a network server, a mail server, and other similar servers allowing interlinkage. Certain connections within relevant networks can be in association with an enterprise intranet protected by relevant firewalls between the user computer and the network, between the user computer and a data wrangler, and between a user computer and secure data within the exchange platform.

Employing such a firewall can allow for secure exchange across the network and through the network server, mail server, and other similar servicers.

In another embodiment, no enterprise intranet and firewall are needed and the user computers may directly interact in the exchange with the secure exchange system across the network. For instance, the user may be able to access the exchange while at home, such as using a mobile enterprise computer, a personally owned computer, a mobile device, and the like. Whenever an exchange of data, or purchase of data, or exchange of data for other value is initiated, such as by purchase transaction of a certified dataset being received at the host server connected to a host database of certified datasets, the host server may facilitate the transaction by providing secure transfer of funds by identifying, extracting financial information, and transferring such funds into and out of relevant users accounts or centralized exchange accounts. The facilitation may be secured transactions involving third party financial institutions.

The exchange platforms described herein can be centralized or distributed among one or more computer systems. Certified datasets according to the teachings herein can be stored in distributed manners, can be verified among multiple computing systems for redundancy and verification by different techniques (e.g., blockchain), and can be stored centrally in secured servers.

In some embodiments, datasets are analyzed, scored, and qualified for exchange. Datasets can be sourced from any variety of providers, locations, and otherwise. The qualification process in some aspects of the present disclosure include providing an accumulated score that is a function of individual scores within a process according to the teachings herein. In one such embodiment, the score can be referred to as a DIM score which interrogates, evaluates, and scores datasets based on the content of the data, its information quality, and its materiality. In the embodiments wherein the score is calculated as a DIM score, the data valuation score can include scoring based on Data (D), Information (I), and Meaning (M). A dataset's data valuation score can be a composite score of a number of different elements, objectively and subjectively scored. Embodiments value the dataset, using one or more human or processor enabled techniques. Some values can be calculated as a DIM score. A skilled artisan will recognize that the embodiment of a DIM score is an exemplary and non-limiting embodiment, and the teachings herein can be adapted to various other embodiments in which the scoring is otherwise performed. In the various embodiments, the accumulated score can be a function of various other objective and subjective factors.

In certain embodiments, the data and the information quality scores are entirely objectively determined and can be interrelated, for instance, where from one dataset to the next, the amount of data increases but the quality of information decreases because of redundancy, the D score may be increased in the latter set but the I score may be lower because of the redundancy, making the product of D+I in each set the same.

In certain embodiments, the scoring is logarithmic within each variable. By example, in the embodiments utilizing a DIM scoring, a dataset with 100,000 fields may have a D score half of a dataset with 1,000,000 fields. In other embodiments, a scoring method can be tied to the volume of data and similarly rise logarithmically, or in a similar manner such that the scored portion related to volume rises in an ever-slowing manner, e.g., the second derivative of this variable is negative when plotted as the total data (x-axis) against the D score for that data (y-axis). Different valuations can be based on different aspects of the dataset. One aspect of the data score is the data size, wherein the greater the size the greater the valuation of the dataset In this manner and with respect to this portion of valuation, a dataset with 10,000 data fields would be valued at an amount less than a dataset of 100,000 data fields, which would be valued at an amount less than a dataset of 1,000,000 data fields.

In certain embodiments, the scoring is the product of the individual variables. For example, in a DIM arrangement, the data valuation score is the product of the individual D, and M valuations. It should be understood that the individual scores of D, I, and M, can be combined in any number of mathematical ways and be usable as valuations according to the teachings herein, and that the term product as used herein is not necessarily a reference to the result of a multiplication function.

Certain embodiments include a data wrangler that assigns scores to the datasets and verifies automatically provided scores. In these embodiments, a wrangler can be one or more of human or automated processors, including a person, a group of persons, or an operating computerized system including one or more processors.

The wrangler or combination of wranglers can load the dataset into the system and review it as part of the wrangling process. In certain embodiments, loading the dataset can comprise the collection and receipt of the dataset from a datasource and connecting that information in a format usable for subsequent data review and analysis. During review, one or more wranglers can validate data, a dataset, or a system of datasets and determine its accuracy. Accuracy measurements and scores can be based on the wrangler's determination based on objective or subjective factors.

In some embodiments, the accuracy can be improved upon by the data wrangler. In these embodiments, for instance, corrections to data can be made, updates to data can be made, missing data can be supplied, or additional fields can be added. In circumstances in which the data-scoring is under the DIM process, a DIM score of a dataset can be increased or decreased based on the actions of the wrangler. It should be understood that in the ordinary course a wrangler would be incentivized to increase the data valuation score through adding accuracy. For instance, in situations in which data fields have missing elements (e.g., city of residence is not included for a certain members of a demographic database, and fields related to those members are blank), a data wrangler is incentivized to add the missing information, thereby increasing the scoring of the data (based on, e.g., volume, completeness).

In certain embodiments, the accuracy of data is scored logarithmically, for instance, a data set with data that is twice as accurate as another dataset may have a relationship of $\log_2$ (dataset_accuracy$_1$)=dataset_accuracy$_2$ and in other embodiments the accuracy is scored linearly, including scoring between 0.0 and 1.0 for completely inaccurate data and accurate data, respectively.

In certain embodiments, data can be evaluated and inter-rogated for internal redundancy, correlation, covariance and causation. In these embodiments data is compared between fields and determination is made using one or more proces-sors whether data in different fields depends in whole or in part on data in certain other fields. In these embodiments, techniques including regression, Pearson correlation, or oth-erwise, are used in interrogation of data to determine rela-tionships between contents of data fields.

In some embodiments correlation approaches complete relationship between data, implying redundancy, causation, or otherwise a deterministic relationship between one data field and another.

Redundancy and diversity are related and in some embodiments represent the same characteristic of datasets. One aspect of the data score is the diversity of the dataset. In these embodiments, as the diversity of the dataset increases, the value of the dataset in certain embodiments increases. In certain embodiments, the diversity of a dataset is determined by the predictive components between por-tions of the dataset or different fields in the dataset. In other embodiments, diversity of a dataset is determined by a measure of repetition between different fields. Redundancy can be calculated to the extent information in one datafield determines data in a second datafield. In such a case using a DIM scoring method, complete redundancy reduces the I or information scoring such that the product of D or data and I or information is the same or substantially the same as a dataset without the redundant data.

Under certain scenarios, valuations differ at different diversity scores, including valuations that have both nega-tive and positive slopes of diversity scores as diversity increases from no diversity to complete diversity (e.g., the second derivative of the diversity score is negative when plotted degree of diversity (x-axis) against the diversity score (y-axis), resulting in a concave downward plot). In these scenarios, a maximum diversity score can be deter-mined at a value that implies certain relationships between data fields, without complete determination between data fields. In these cases, it is beneficial to have some predictive value between data fields for use in exploiting data, for instance in generating p values for correlation between data fields within a dataset.

In certain embodiments, the persistence of the dataset can be calculated. Certain persistence values are a function of the validity and relevance calculations. The total data valu-ation score of a dataset can vary over time in scenarios of low persistence. Data in many formats has a validity or other valuation that changes over time and can be modeled as a half life. That is, similar to radioactive decay, validity of certain data tends to repetitively decrease by half over a certain given period of time.

In many embodiments, the half life of the data can be determined based on the type, source, and contents of the data.

In certain other embodiments, accuracy of data that is differently aged can be determined and from that determi-nation, the half life can be set based on a best fit analysis and determination of coefficients in a suitable half life equation.

One such equation could be $$N(t) = N_0\left(\frac{1}{2}\right)^{\frac{t}{t_{1/2}}}$$

Where N(t) is the measure of accuracy of the data after time t, $N_0$ is the accuracy of the data at time 0, t is time, and $t_{1/2}$ is the derived half life of the data.

In other embodiments, one or more wranglers can set the half life formula based on objective or subjective determi-nation of appropriate values.

In certain embodiments, the data is scored for its rel-evance by one or more data wranglers. Relevance of data is determined by among other things the effect of the data on the communities of interest.

In certain embodiments, the relevance score can be dynamic depending on the dataset's differing value to dif-fering groups. In such an embodiment, by example, dataset's relevance score high for certain bodies, such as credit scores of a population for mortgage lenders, blood type of a population to surgeons, and otherwise.

In certain other embodiments, the relevance score can change depending on the market for the information, for instance, credit scores of a given population may have high relevance for mortgage lenders and low relevance for school districts. In these aspects, a wrangler can evaluate based on market segment or otherwise to provide a proper relevance score.

In some embodiments, the relevance score is a scalar between 0.0 and 1.0.

In certain other embodiments, a logarithmic valuation of relevance can be made. It should be apparent to the reader that any number of mathematical determinations can be made for scoring the relevance of the information. In other embodiments, differing mathematical functions are appro-priate for valuations, including functions with negative second derivatives.

In certain embodiments, the scarcity of the dataset is evaluated and scored by one or more data wranglers. In these embodiments, the dataset is evaluated based on its avail-ability to the relevant public outside an exchange. Scarcity can change based on, for instance, ease of accumulation of the data, privacy of data, cost of acquisition of data, recency of acquisition or other such factors that limit the ability of the relevant public to acquire the same. In the case of high scarcity, the dataset can be provided a high scarcity score. Scarcity can be exemplified through, for instance, highly protected information, information that was derived from unique testing, and information that is accumulated from high numbers of different sources, among other things.

Certification processes can be included with certain of the datasets upon formation of a score, including a DIM score. Certification can be a process to certify the review, scoring and valuation of the dataset, under the data valuation pro-cess. Certification process can include identifiers of prov-enance of the dataset for the wrangler or wranglers involved, identifiers of the method of determining data valuation score, identifiers of the history of the wranglers or wranglers involved. In certain embodiments, the certification of a data valuation score is embedded with the dataset in such a manner that the data valuation score is permanently affixed to the dataset through the exchange.

It is anticipated that the market value of datasets will be closely related to the score, including the DIM score, of the dataset, although different datasets in different markets with similar data valuation scores could be valued differently, subject to market forces.

With the data valuation score as a semi-permanent feature of the dataset, the market value can move without effect on the data valuation score.

In this manner, a data valuation score becomes a permanent aspect of the dataset and is protected against, for example, speculation forces that may change the value of a particular dataset at a data valuation score.

It is anticipated that the marketplace incentivizes the creation of additional and higher quality datasets as a monetizable product of wranglers, with wranglers taking datasets and increasing their market value by adding accuracy, validity, reducing redundancy, and otherwise adding data valuation value to datasets through review and revision of datasets. Data wranglers can add metadata to datasets to increase the value of the data, including information regarding quality of data, interested markets for the data, age of data, expected frequency of updates of data, and otherwise. In this manner, professional wranglers can produce monetizable products, and in turn, particularly skilled wranglers can be recognized as quality at adding data valuation value to datasets.

It is further anticipated that wranglers can be accountable to their data valuation scoring In certain embodiments, all wranglers who reviewed, scored, or attempts to score a dataset can be identified through particular markers associated with the dataset. Individual data wranglers will be accountable the data valuation scoring they have produced and affixed to the dataset, and are accountable for the appropriate handling of datasets. For example, a data wrangler would be accountable to properly identify the existence of and handle personally identifiable information such that its disclosure does not violate relevant jurisdictional laws, a data wrangler would be accountable for only disclosing information in a manner that complies with relevant companies' business rules and agreements with data-providers (e.g., customers), and a data wrangler would be accountable for complying with international rules on privacy, and other relevant law. It is contemplated that other guidance, rules, regulations, and laws will be applicable to the various relevant datasets.

In some embodiments, scoring may be performed in whole or in part through the use of Artificial Intelligence (AI) and/or Machine Learning techniques and mechanisms to generate scoring based on a learned or trained dataset scoring history, including histories of one or more wranglers. In certain of these embodiments, learning can be preferenced by a scoring of the quality of the plurality of wranglers, with the biases of higher scored wranglers disproportionately influencing the training of the AI/Machine Learning. Embodiments may combine the above techniques with Artificial Intelligence, Machine Learning or similar techniques to improve the scoring system. In situations in which AI/Machine Learning techniques or other appropriate automated techniques are involved in determined the M or meaning score, the data wrangler serves as primarily or entirely in a role of validation of the automated scoring process.

Various of the above operations disclosed herein may be performed in real time (or substantially real time). In this case, e.g., if a wrangler scores a dataset, certain embodiments can apply the attributes of the scoring to future versions of the dataset or other similarly disposed datasets to advance those datasets toward certification. In these situations, certain embodiments construct a profile in real-time using the scoring history and tendency of one or a plurality of wranglers and may make those suggestions to apply the scoring in microseconds (real time or substantially real time so that there is little perceptible delay during the process).

Rather than scoring datasets on an all-or-nothing, binary, basis, various of the disclosed embodiments score portions of data. According to certain aspects of this disclosure, in the techniques taught herein, the wrangler may score a portion of the dataset and apply the scoring to a broader portion or the remainder of the dataset based on, for instance, different weights and multiple weighting factors, probabilities, scope of datasets, and the like. Certain embodiments may apply this approach to massive data sets in real time using a continuously evolving weighting process.

Artificial Intelligence systems, including at least some of the following mechanisms may be employed in certain embodiments to manage the complexity of the real time weightings: Bayesian networks; neural networks; machine learning; genetically evolving algorithms; etc.

The described process can be achieved with the following process flow. This process is given by example only and the ordering of the process need not be in the order described. The process can be iterative in whole or in part, and certain portions of the process can be repeated or skipped entirely.

First, the dataset is provided to the system or methods that valuate the data through, for instance, a computer linkage or appropriate API, and the data within the dataset is extracted. Within this step, a licensed user called a data wrangler performs the connection with a dataset (e.g., a file, a table in a database, or a table that comes from API connection). The system can now access the complete dataset and can analyze and extract parts of it as necessary for valuation or creation of a data valuation score. In some embodiments, the system extracts a random sample or a nonrandom sample with sufficient safeguards for representative nature or adjustments for its representative nature, and, in case of databases, can execute queries that return metadata such as table schemes and indexes.

Second, an algorithm runs that extracts metadata. Based on the sample and metadata, a series of algorithms, including regression and classification machine learning algorithms (that together are called the metadata extractor tool) measures, extracts and calculates further information relevant to the dataset. Among the information further calculated, the metadata extractor can be used to determine characterization of features (data types and meaning, such as e.g., addresses, phone numbers, television shows, product preferences, or otherwise); data quality (e.g., thoroughness, agedness); statistical metrics for individual numerical or categorical features characteristics (e.g., likelihood of correctness of any one given aspect of the data); completeness of information of features; redundancy of information between features; diversity of features' characteristics (e.g., deterministic or p-value between categories of information). From this information, a metadata extracted object is created. With some or all this extracted data, a scored object (e.g., a DIM Object) is created and added to and or used in conjunction with the metadata extracted object. The scored object (e.g., DIM Object) can contain some or all of a combined score, such as a scalar number determined based on the techniques taught herein (e.g., a DIM score), the components score (e.g., for DIM scoring, a score for each of D or data, I or information and M or meaning), and the relevant report, with key metrics.

Third, the dataset can be registered. In this embodiment, based on an object from metadata extraction and data valuation object, a survey for the Data Wrangler is created. The survey can have two purposes: validate or invalidate all the algorithm findings and add further information regarding how the dataset is relevant in the world. Among the additional information that can be added include labels, categories and descriptions for features; represented communities (CI) within the information (e.g., identification of the real world groups for whom data related to that group is compiled); impacted communities (e.g., identification of real world groups for whom the information would be useful or necessary); relevance to communities (e.g., a determination of a degree of such usefulness or necessity); validity of the data; persistence of validity and relevance of data in time; business opportunities (e.g., identified uses of data for impacted communities). The introduced data is called Registered Data and can be added to the meta data extractor tool.

Fourth, the data valuation score can be readjusted. Taking into accountRegistered Data, the data valuation score can be adjusted in various different ways, including invalidations (e.g., false positives corrected by the data wrangler) modify (e.g., lower) the previously calculated data valuation score; newly added characteristics can increase the score; validations and invalidations can increase the score because they add certainty to automated process (e.g., machine/AI-alone) findings.

Fifth, a certificate for data asset is generated. A Certificate (a new Object) is created. It contains in some embodiments some or all of a pointer to dataset, a pointer to a metadata extractor, a scored object (e.g., data valuation Object) with score, a unique id created using all information from the metadata extraction and Register information. In these embodiments, each dataset has a unique certificate. The Certificate represents the dataset in the system, and is now considered a data asset. Every interaction with the dataset in the system is through the Certificate. In these embodiments, the Certificate allows for traceability, provenance (e.g., information on origin) and transparency. The certificate in some embodiments guarantees the value on the dataset found by the data valuation score.

Sixth, a report for data assets can be provided.

The Certificate can be presented as a document for the user and can be shared within or across organizations. It can contain the score (e.g., data valuation score), report, hash number and an identification image (e.g., QR code).

The certificate can be used for governance and data asset transaction purposes.

Certain embodiments of the valuation can be seen herein. For example, the following dataset is provided related to superheroes. A very small table with interesting information of about 100 super heroes. In this example, the dataset is 16 columns, 100 rows (this would be considered very small in most scenarios contemplated herein). The dataset is scored on the D or data metric with a score of D:1.2. There can be a high diversity of types of information within the dataset: numbers, categories, names, texts and images. These can be well balanced categories with good numeric distributions, no redundancy, and limited to no predictive quality between the different pieces of data. This provides an information score of 1:0.87. The meaning of the data can be evaluated by a data wrangler. It is relevant and has impact for the entertainment industry, it has rich cultural background, and a large impact community. The information has a long half life veracity and relevance. This provides a meaning score of M:0.75. In total, in this embodiment where the data valuation score is the ordinary product of the three component scores, the data valuation score (DIM) is: 0.783.

A second example can be made of a dataset of telephone information from a large country, such as China, or the United States, or any other relevant location or groups of locations. The dataset can be a very large database with information from mobile users' activity comprising 10 columns, 7,000,000,000 rows. This dataset is much larger than the previous dataset, and the data score based on the logarithmic nature of this component increases to D:5.8. In this dataset, there is a medium diversity of data types: numbers, categories, and geographic coordinates by example. There are poorly balanced categories with high redundancy, providing a resultant information score of I:0.5. This information would be relevant to the entertainment and tech industry, and have a very large impact community. However, the information would have a very short half life, low veracity and low relevance as determined by a data wrangler or an automated process, or both. This could result in a meaning score of M:0.60. The product of the individual factors in this embodiment is DIM:1.74.

A third example can be made of the Dataset 3: CPF Brazil (i.e., the natural persons register of Brazil). This dataset could be a large database of demographic information about the work population of Brazil, comprising 20 columns, 200,000,000 rows. While its data value would be higher than the superhero set, it is much lower than telephonic dataset from a large country, with a resultant data value of D:3.9. The information provided has a low diversity of types: numbers, and categories, with poorly balanced categories and high redundancy. This results in a relatively lower information score of I:0.41. The information could have a very large impact community, but with short half life veracity (due in part to the ever-changing nature of demographic information) and relevance. The information has very low scarcity (due in part to its public availability). This can result in an automated or data wrangler-generated meaning score of M:0.45. The product in this case for the total score is DIM:0.72.

The embodiments herein related to data valuation scoring, the data valuation can measure individual datasets and groups of datasets. One of its uses can be in measuring the value an organization stores in all or a certain subset of its datasets. It is important to understand how the score can behave when combining more than one datasets. The combined score (e.g., DIM score) of two datasets in some embodiments is not the sum of its individual scores. In certain embodiments, one of the key factors that the score uses for value identification is interconnectivity: when a dataset has features with meaningful connections, such as dependency (in which case one feature can be used to predict the other, such as correlation and p-score) or intersection, its score raises. Inversely, when features within a dataset are redundant (absolute dependency) its score decreases. This provides a non-linear scoring, where the highest scoring for this element can occur in datasets where there is neither complete independence of factors nor complete dependency of the factors. On one end of that spectrum, completely redundant information can be added to the dataset without a change in the combined score (e.g., DIM score): the addition of a copy of a feature on a dataset can provide more data (e.g., the D value will go up because the size of the data increased), but the information score (such as the I score) can go down because of the detected redundancy. By this technique, the addition of redundant information would have the effect of cancelling the other in the product of D+I.

In some embodiments, when the combined score is calculated over two datasets, relations between features are also taken into account, so these two scenarios (and a combination of them) are possible.

By example, two datasets, with data valuation values $\partial 0$ and $\partial 1$, contain features with meaningful relations across the datasets. The data valuation score of the group that contains both datasets, $\partial\{0,1\}$ is higher than the sum of the individual scores. $\partial\{0,1\} > \partial 0 + \partial 1$ Two similar datasets, with data valuation values $\partial 0$ and $\partial 1$, may contain various features that are repeated, or almost completely correlational. The data valuation score of the group that contains both datasets, $\partial\{0,1\}$ can be in this instance lower than the sum of the individual scores, that is, $\partial\{0,1\} < \partial 0 + \partial 1$ In this manner, the scoring of combined datasets can be a non-linear function. By contrast, the costs of storing and process datasets is more likely to be linear, or near to linear.

There are many potential uses of a scored dataset, such as through a data valuation scoring. Among them, the scoring techniques taught herein (e.g., DIM Score) can be used as a tool for incrementally raise data content and fidelity for a data set, and the increased value of that data.

The scored data set report (e.g., DIM Score Report) in certain embodiments provides a detailed assessment of datasets value and quality from multiple perspectives, providing a guide for improving individual variables, datasets, groups, and datasets, setting up a strategy for data acquisition, pointing to valuable combinations and in general raising the value of data of any company. The combined score can be used as a tool for insight and impact. The combined score report in certain embodiments provides by itself rich perspective over datasets, already providing insight and guiding towards impact, connecting key actors, economic features and key metrics, with business opportunities and positive impact on detected communities.

The combined score (e.g., DIM score) can be mise en place. The data valuation process of registering and Score Report can set the best possible basis for structuring complex groups of datasets for being efficiently loaded and queried, analyzed, transformed, visualized and monetized.

The combined score such as the data valuation Score can be used as a tool for efficiency (cost reduction). Under certain embodiments under the teachings herein, the data valuation Score is present in every query and transformation process of the dataset, continuously pointing to the most efficient gradient in the values and costs space, maximizing the ratio and thus keeping costs at bay while continuously extracting value, opportunity and best decision making Value in data is non-linear while costs are. This allows for leveraging opportunities to increase data value when the value curve exceeds the cost curve.

The process of maximizing data valuation score in groups of datasets while minimizing costs has a large impact in the ability of increasing the value of the underlying asset (e.g., datasets) or the companies owning such assets.

Data valuation scores can be used for noise reduction. Noise that additional data adds is likely worse than the costs of keeping low value data in storage and processes.

The automatized processes can enrich datasets and provide prior structural and contextual information, enabling users' platform to identify the pertinent standard automatized process of analysis, transformation, visualization, mise en place, and immediate outcomes.

Combined scoring taught herein, including data valuation scoring, allows for human-machine collaboration. A data valuation Score can combine multiple algorithms with excellent register practices, thus creating a synergy between algorithms and human criteria. This initial register step set the basis for human-machine collaboration along further transformation, analysis, and visualization.

The data valuation score can be used as a tool for monetization. Data valuation score in certain embodiments provides guidance for designed scarcity and pricing, including the launch of new data products that require initial prices.

The data valuation scoring techniques taught herein can be used as a tool for exploring non-linear value growth when combining datasets. When datasets are combined new value emerges from correlations, and relations across features in datasets become apparent. Data valuation score reveals the emerging value of these new relations, even in datasets apparently unrelated.

FIG. 1 shows a flow of the process 100 under certain of the teachings herein. At step 101, a computer system receives data from a data source and extracts data within for analysis. In many of the embodiments, a licensed user called 'data wrangler' performs the connection with a dataset (a file, a table in a database, or a table that comes from API connection by example). The system now has access to the complete dataset and can analyze and extract parts of it. It extracts a random sample (or a sub-portion otherwise intended to be a useful data load) and, in case of databases, executes queries that return metadata such as table schemes and indexes. At step 102, the algorithm to extract metadata runs. Based on the sample and metadata, a series of algorithms, including regression and classification machine learning algorithms (that together comprise the metadata extraction process) can measure, extract and calculate further information. Among them, characterization of features (data types and meaning), data quality, statistical metrics for individual numerical or categorical features and characteristics, completeness of information of features, redundancy of information between features, diversity of features' characteristics. From this a meta data extractor object is created. With all this extracted data, a aggregate or combined scoring object (e.g., DIM object) is created and added to the object from the metadata extraction. The combined aggregate score object (e.g., DIM object) can contain a combined score number (e.g., DIM score number), combine score components (e.g., DIM components score for D, I and M), and a report, with key metrics. At step 103, the dataset is registered. Based on the metadata extraction object and DIM object, a survey for the data wrangler is created. The survey can have many purposes including validating or invalidating all the algorithm findings and adding further information regarding how the dataset is relevant in the world (by example, labels, categories and descriptions for features, represented communities (CI), impacted communities, relevance to communities, validity of the data, persistence of validity and relevance of data on time, and business opportunities). This introduced data is called registered data and is added to the metadata extractor tool. At step 104, a data valuation score previously calculated can be iteratively readjusted. Taking into account registered data, a data valuation score can be adjusted in different ways, including by example invalidations (false positive corrected by the data wrangler) modify (lower) the previous score, newly added characteristics increase the score, validations and invalidations increase the score by adding certainty to machine-alone findings. At step 105 a certificate for data asset can be created. A certification (which can be a new object) can be created. It can contain, among other things, a pointer to the dataset, a pointer to metadata extractor tool, a data valuation object with the data valuation score, a unique id (hash) created using all metadata extractor and register information. Each dataset under this embodiment has then a unique certificate. The certificate represents the dataset in the system, and is now considered now a data asset. In these embodiments, every interaction with the dataset in the system is through the certificate. The certificate is designed for traceability, provenance, transparency. The certificate guarantees the value on the dataset found by the data valuation score. In step 106, a report for the data asset can be generated. The certificate is presented as a document for the user and can be shared within or across organizations. It can contain the data valuation score, report, hash number and a QR code. The certificate is recorded in a database and can be used for governance and data asset transaction purposes, among other things.

Figure 2:
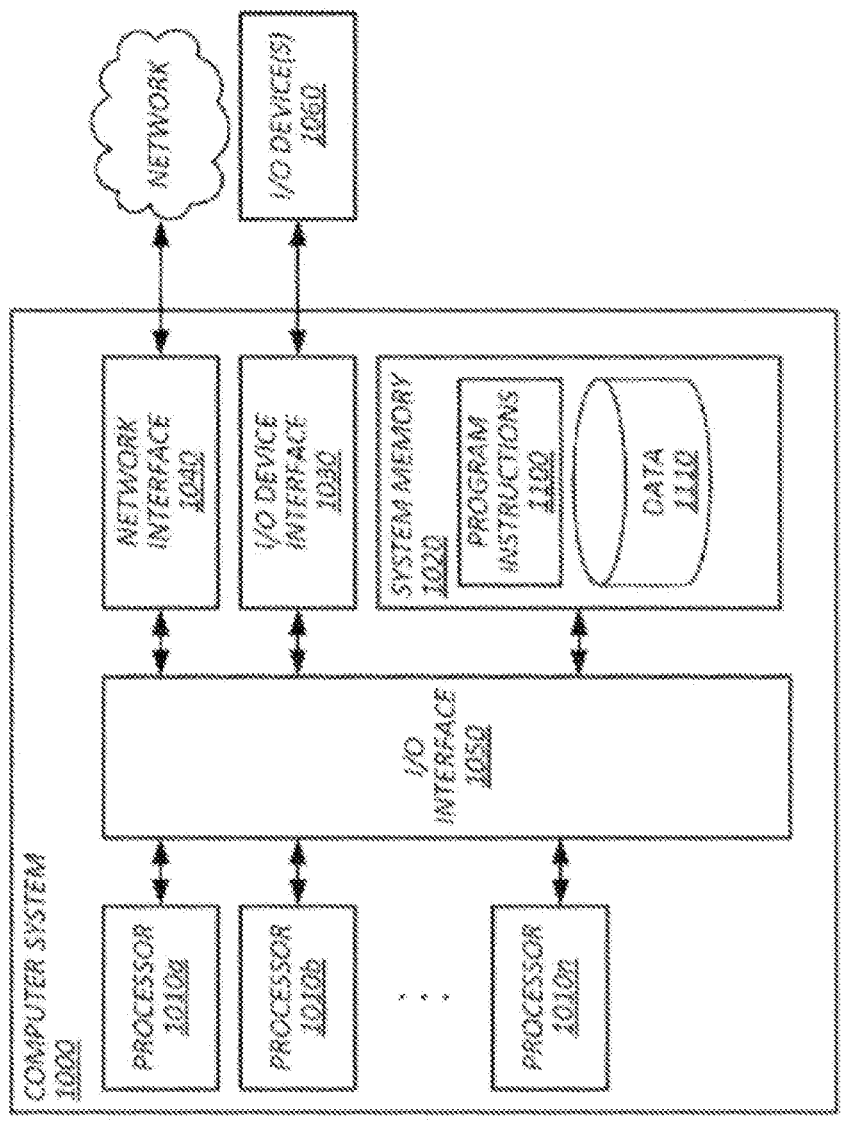
FIG. 2 is a computer system with associated memory and connections usable under certain embodiments of the teachings herein.

FIG. 2 shows an exemplary computer system 1000 by which the present techniques may be implemented in accordance with some embodiments. Various portions of systems and methods described herein, may include or b e executed on one or more computer systems similar to computer system 1000. Further, processes and modules described herein may be executed by one or more processing systems similar to that of computer system 1000.

Computer system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel o sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal-oxide-semiconductor (CMOS) chip, an FPGA (field programmable gate array), a PGA (programmable gate array), or an ASIC (application specific integrated circuit) such as a tensor processing unit (TPU). Computer system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Program instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors $1010a$-$1010n$) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors $1010a$-$1010n$, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors $1010a$-$1010n$). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system

1000 may be transmitted to computer system 1000 via transmission media or signals such as electrical, electromagnetic, or digital signals, sent via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information sent over networks, in which case, to the extent information (e.g., content) is said to be supplied or otherwise provided, the information may be provided by sending instructions to retrieve that information from a content delivery network.

Certain embodiments of the described method include a method for valuing a plurality of sets of data, comprising receiving, by a computer system, a plurality of datasets, each of the datasets comprising a plurality of data; creating, by the computer system, a first sub-score for each of the plurality of datasets, the first sub-score comprising a first numerical value, the first numerical value being larger for datasets with more data; creating, by the computer system, a second sub-score for each of the plurality of datasets, the second sub-score comprising a second numerical value, the second numerical value varying based on information characteristics, the second sub-score being larger for improved information characteristics, wherein improved information characteristics are characterized by one or more of increased structural quality, increased completeness, increased interconnectivity, increased diversity, decreased redundancy; creating a third sub-score for each of the plurality of datasets, the third sub-score comprising a third numerical value, the third numerical value varying based on meaning characteristics, the third sub-score being larger for improved meaning characteristics, wherein improved meaning characteristics are characterized by one or more of increased impact on a community, an increased number of impacted communities, greater veracity, greater relevance to an impacted community, greater scarcity; creating a composite score for each of the plurality of datasets that is a mathematical combination of the first, second, and third sub-scores.

The teachings herein include the above-described method, wherein the third sub-score is scored by a person.

The teachings herein include the above-described method, wherein the first sub-score increases logarithmically with increased data size.

The teachings herein include the above-described method, further comprising the step of appending, by the computer system, a certification of the composite score to each of the datasets.

The teachings herein include the above-described method, wherein the second sub-score further comprises a scoring of interrelatedness between data within a dataset, such scoring being a non-linear function, wherein zero interrelatedness of data and complete interrelatedness of data score a lower score than partial interrelatedness of data.

The teachings herein include the above-described method, wherein the second sub-score ranges from 0 to 1 and the third sub-score ranges from 0 to 1.

The teachings herein include the above-described method, wherein the second sub-score is scored by the computer system using artificial intelligence or machine learning wherein the artificial intelligence or machine learning was trained on a subset of the plurality of datasets.

The teachings herein include the above-described method, further comprising iteratively adjusting one or more of the first sub-score, second sub-score, or third sub-score by adding or deleting data; creating an adjusted composite score from the iteratively adjusted one or more of the first sub-score, second sub-score, or third sub-score.

The teachings herein include the above-described method, further comprising the steps of comparing data from a first dataset with a first composite score and data from a second dataset with a second composite score of the plurality of datasets; calculating a third composite score, the third composite score dependent on the comparison of data from the first dataset and the second dataset.

The teachings herein include the above-described method, further comprising comparing the data contents with laws, rules, or regulations for privacy information, personally identifiable information, medical information, copyrighted information, age-restricted information, geographically embargoed information, or otherwise restricted information under a law, rule or regulation; limiting the availability of data based on the laws, rules, or regulations.

The teachings herein a system for creating exchangeable data, comprising a tangible, non-transitory, machine readable medium storing instructions that when executed by one or more processors, effectuate operations comprising receiving, with one or more servers, a plurality of datasets, each of the datasets comprising a plurality of data; creating a first sub-score for each of the plurality of datasets, the first sub-score comprising a first numerical value, the first numerical value being larger for datasets with more data; creating a second sub-score for each of the plurality of datasets, the second sub-score comprising a second numerical value, the second numerical value varying based on information characteristics, the second sub-score being larger for improved information characteristics, wherein improved information characteristics are characterized by one or more of increased structural quality, increased completeness, increased interconnectivity, increased diversity, decreased redundancy; a human that serves as data wrangler to create a third sub-score for each of the plurality of datasets, the third sub-score comprising a third numerical value, the third numerical value varying based on meaning characteristics, the third sub-score being larger for improved meaning characteristics, wherein improved meaning characteristics are characterized by one or more of increased impact on a community, an increased number of impacted communities, greater veracity, greater relevance to an impacted community, greater scarcity; a computer processor with associated memory that is operable to receive the first, second and third sub-scores and operable to create a composite score for each of the plurality of datasets that is a mathematical combination of the first, second, and third sub-scores.

The teachings herein include the above-described system, wherein the first sub-score increases logarithmically with increased data size.

The teachings herein include the above-described system, wherein the computer processor is further operable to append a certification of the composite score to each of the datasets.

The teachings herein include the above-described system, wherein the second sub-score further comprises a scoring of interrelatedness between data within a dataset, such scoring being a non-linear function, wherein zero interrelatedness of data and complete interrelatedness of data score a lower score than partial interrelatedness of data.

The teachings herein include the above-described system, wherein the second sub-score ranges from 0 to 1 and the third sub-score ranges from 0 to 1.

The teachings herein include the above-described system, wherein the second sub-score is scored by the computer system using artificial intelligence or machine learning wherein the artificial intelligence or machine learning was trained on a subset of the plurality of datasets.

The teachings herein include the above-described system, wherein the data wrangler further iteratively adjusts one or more of the first sub-score, second sub-score, or third sub-score by adding or deleting data and creates an adjusted composite score from the iteratively adjusted one or more of the first sub-score, second sub-score, or third sub-score.

The teachings herein include the above-described system, wherein the computer processor is further operable to compare data from a first dataset with a first composite score and data from a second dataset with a second composite score of the plurality of datasets calculate a third composite score, the third composite score dependent on the comparison of data from the first dataset and the second dataset.

The teachings herein include the above-described system, wherein the data wrangler further compares the data contents with laws, rules, or regulations for privacy information, personally identifiable information, medical information, copyrighted information, age-restricted information, geographically embargoed information, or otherwise restricted information under a law, rule or regulation and limits the availability of data based on the laws, rules, or regulations.

The teachings herein include a tangible, non-transitory, machine readable medium storing instructions that when executed by one or more processors, effectuate operations comprising receiving, with one or more servers, a plurality of datasets, each of the datasets comprising a plurality of data; creating a first sub-score for each of the plurality of datasets, the first sub-score comprising a first numerical value, the first numerical value being larger for datasets with more data; creating, using artificial intelligence or machine learning a second sub-score for each of the plurality of datasets, the second sub-score comprising a second numerical value, the second numerical value varying based on information characteristics, the second sub-score being larger for improved information characteristics, wherein improved information characteristics are characterized by one or more of increased structural quality, increased completeness, increased interconnectivity, increased diversity, decreased redundancy; creating, using artificial intelligence or machine learning, a third sub-score for each of the plurality of datasets, the third sub-score comprising a third numerical value, the third numerical value varying based on meaning characteristics, the third sub-score being larger for improved meaning characteristics, wherein improved meaning characteristics are characterized by one or more of increased impact on a community, an increased number of impacted communities, greater veracity, greater relevance to an impacted community, greater scarcity; creating a composite score that is the product of the first, second and third sub-scores.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating" "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) may have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference

The invention claimed is:

1. A method for valuing a plurality of sets of data, comprising:

receiving, by a computer system, a plurality of datasets, each of the plurality of of datasets comprising a plurality of data;

extracting, by the computer system using a regression and classification machine learning algorithm, metadata from the plurality of datasets;

creating, by the computer system using the regression and classification machine learning algorithm, a metadata extracted object that is associated with each respective dataset of the plurality of datasets;

creating, by the computer system, a first sub-score for each of the plurality of datasets, the first sub-score comprising a first numerical value, the first numerical value being larger for datasets with more data;

creating, by the computer system, a second sub-score for each of the plurality of datasets, the second sub-score comprising a second numerical value, the second numerical value varying based on information characteristics, the second sub-score being larger for improved information characteristics, wherein the improved information characteristics are characterized by one or more of increased structural quality, increased completeness, increased interconnectivity, increased diversity, decreased redundancy, and wherein the information characteristics are determined in least in part from the metadata extracted object;

creating, by the computer system, a third sub-score for each of the plurality of datasets, the third sub-score comprising a third numerical value, the third numerical value varying based on meaning characteristics, the third sub-score being larger for improved meaning characteristics, wherein the improved meaning characteristics are characterized by one or more of increased impact on a community, an increased number of impacted communities, greater veracity, greater relevance to an impacted community, greater scarcity, higher validity, lower veracity decay, increased users within a community, wherein the meaning characteristics are determined in least in part from the metadata extracted object, and wherein the first sub-score, the second sub-score, or the third sub-score is determined from a portion of each of the plurality of datasets and the scoring is applied to a remainder of the plurality of datasets based on weighting factors;

creating, by the computer system, a composite score for each of the plurality of datasets that is a mathematical combination of the first, second, and third sub-scores, wherein creating the composite score further comprises filtering redundant data to reduce memory storage requirements and processor utilization;

creating, by the computer system, a scored object from the composite score for each of the plurality of datasets;

creating, by the computer system, a plurality of data assets that each include a dataset of the plurality of datasets, the scored object for that dataset of the plurality of datasets, and the metadata extracted object for that dataset of the plurality of datasets;

creating, by the computer system and for each data asset, a certificate to include machine-readable integrity data, the certificate being automatically verifiable among multiple computing systems, including distributed systems, to ensure traceability, provenance, transparency, and authenticity of the dataset of each data asset, wherein the certificate is a data object independent of the dataset, wherein the certificate includes the composite score of the dataset;

hashing, by the computer system, the metadata extracted object to generate a unique identifier, wherein the unique identifier is included in the certificate to guarantee the composite score of the dataset;

appending, by the computer system, the certificate for each data asset to each respective data asset, wherein the certificate includes pointers to the dataset, the metadata extracted object for that dataset, and the scored object; and recording, by the computer system, the plurality of data assets and each certificate for each data asset in a secure database accessible to a plurality of computer systems.

2. The method of claim 1, wherein the third sub-score is adjusted by a person.

3. The method of claim 1, wherein the first sub-score increases logarithmically with increased data size.

4. The method of claim 1, wherein the second sub-score further comprises a scoring of interconnectivity between data within a dataset, such scoring being a non-linear function, wherein zero interrelatedness of data and complete interrelatedness of data score a lower score than partial interrelatedness of data.

5. The method of claim 4, wherein the second sub-score ranges from 0 to 1 and the third sub-score ranges from 0 to 1.

6. The method of claim 1, wherein the second sub-score is scored by the computer system using artificial intelligence or machine learning, wherein the artificial intelligence or the machine learning was trained on already scored and corrected datasets.

7. The method of claim 1, further comprising:

empirically adjusting one or more of the first sub-score, the second sub-score, or the third sub-score by adding or deleting data; creating an adjusted composite score from the empirically adjusted one or more of the first sub-score, the second sub-score, or the third sub-score.

8. The method of claim 1, further comprising:

comparing data from a first dataset with a first composite score and data from a second dataset with a second composite score of the plurality of datasets, the comparison including analyzing the first dataset and the second dataset to determine relationships between the data within the datasets;

calculating a third composite score, the third composite score dependent on the comparison of data from the first dataset and the second dataset, the third composite score dependent on relationship between data of the first dataset and the second dataset.

9. The method of claim 1, further comprising:

enriching data contents with laws, rules, or regulations for privacy information, personally identifiable information, medical information, copyrighted information, age-restricted information, geographically embargoed information, or otherwise restricted information under a law, rule or regulation; limiting availability of data based on the laws, the rules, or the regulations.

10. A system for creating exchangeable data, comprising:

a computer processor configured to operate a tangible, non-transitory, machine-readable medium storing instructions that when executed by one or more processors, effectuate operations comprising:

receiving, with one or more servers, a plurality of datasets, each of the plurality of datasets comprising a plurality of data;

extracting, using a regression and classification machine learning algorithm, metadata from the plurality of datasets;

creating, using the regression and classification machine learning algorithm, a metadata extracted object that is associated with each respective dataset of the plurality of datasets;

creating a first sub-score for each of the plurality of datasets, the first sub-score comprising a first numerical value, the first numerical value being larger for datasets with more data; and creating a second sub-score for each of the plurality of datasets, the second sub-score comprising a second numerical value, the second numerical value varying based on information characteristics, the second sub-score being larger for improved information characteristics, wherein the improved information characteristics are characterized by one or more of increased structural quality, increased completeness, increased interconnectivity, increased diversity, decreased redundancy, and wherein the information characteristics are determined in least in part from the metadata extracted object;

a data wrangler to create a third sub-score for each of the plurality of datasets, the third sub-score comprising a third numerical value, the third numerical value varying based on meaning characteristics, the third sub-score being larger for improved meaning characteristics, wherein the improved meaning characteristics are characterized by one or more of increased impact on a community, an increased number of impacted communities, greater veracity, greater relevance to an impacted community, greater scarcity, higher validity, lower veracity decay, increased users within a community, wherein the meaning characteristics are determined in least in part from the metadata extracted object, and wherein the first sub-score, the second sub-score, or the third sub-score is determined from a portion of each of the plurality of datasets and the scoring is applied to a remainder of the plurality of datasets based on weighting factors;

a computer processor with associated memory that is operable to receive the first, second and third sub-scores and operable to create a composite score for each of the plurality of datasets that is a mathematical combination of the first, second, and third sub-scores, wherein creating the composite score further comprises filtering redundant data to reduce memory storage requirements and processor utilization, create a scored object from the composite score for each of the plurality of datasets, create a plurality of data assets that each include a dataset of the plurality of datasets, the scored object for that dataset of the plurality of datasets, and the metadata extracted object for that dataset of the plurality of datasets, create, for each data asset, a certificate to comprise machine-readable integrity data, the certificate being automatically verifiable among multiple computing systems, including distributed systems, to ensure traceability, provenance, transparency, and authenticity of the dataset of each data asset, wherein the certificate is a data object independent of the dataset, wherein the certificate includes the composite score of the dataset, hash the metadata extracted object to generate a unique identifier, wherein the unique identifier is included in the certificate to guarantee the composite score of the dataset, and append the certificate for each data asset to each respective data asset, wherein the certificate includes pointers to the dataset, the metadata extracted object for that dataset, and the scored object; and a secure database in which the plurality of data assets and each certificate for each data asset is recorded and accessible by computer processers.

11. The system of claim 10, wherein the first sub-score increases logarithmically with increased data size.

12. The system of claim 10, wherein the second sub-score further comprises a scoring of interrelatedness between data within a dataset, such scoring being a non-linear function, wherein zero interrelatedness of data and complete interrelatedness of data score a lower score than partial interrelatedness of data.

13. The system of claim 12, wherein the second sub-score ranges from 0 to 1 and the third sub-score ranges from 0 to 1.

14. The system of claim 10, wherein the second sub-score is scored by the computer processor using artificial intelligence or machine learning, wherein the artificial intelligence or the machine learning was trained on previously scored and corrected datasets.

15. The system of claim 10, wherein the data wrangler further iteratively adjusts one or more of the first sub-score, the second sub-score, or the third sub-score by adding or deleting data and creates an adjusted composite score from the iteratively adjusted one or more of the first sub-score, the second sub-score, or the third sub-score.

16. The system of claim 10, wherein the computer processor is further operable to: compare data from a first dataset with a first composite score and data from a second dataset with a second composite score of the plurality of datasets; calculate a third composite score, the third composite score dependent on the comparison of data from the first dataset and the second dataset.

17. The system of claim 10, wherein the data wrangler further compares data contents with laws, rules, or regulations for privacy information, personally identifiable information, medical information, copyrighted information, age-restricted information, geographically embargoed information, or otherwise restricted information under a law, rule or regulation and limits availability of data based on the laws, the rules, or the regulations.

18. A tangible, non-transitory, machine readable medium storing instructions that when executed by one or more processors, effectuate operations comprising:

receiving, with one or more servers, a plurality of datasets, each of the plurality of datasets comprising a plurality of data; creating a first sub-score for each of the plurality of datasets, the first sub-score comprising a first numerical value, the first numerical value being larger for the plurality of datasets with more data;

extracting, using a regression and classification machine learning algorithm, metadata from the plurality of datasets;

creating, using the regression and classification machine learning algorithm, a metadata extracted object that is associated with each respective dataset of the plurality of datasets;

creating, using artificial intelligence or machine learning, a second sub-score for each of the plurality of datasets, the second sub-score comprising a second numerical value, the second numerical value varying based on information characteristics, the second sub-score being larger for improved information characteristics, wherein the improved information characteristics are characterized by one or more of increased structural quality, increased completeness, increased interconnectivity, increased diversity, decreased redundancy, and wherein the information characteristics are determined in least in part from the metadata extracted object;

creating, using artificial intelligence or machine learning, a third sub-score for each of the plurality of datasets, the third sub-score comprising a third numerical value, the third numerical value varying based on meaning characteristics, the third sub-score being larger for improved meaning characteristics, wherein the improved meaning characteristics are characterized by one or more of increased impact on a community, an increased number of impacted communities, greater veracity, greater relevance to an impacted community, greater scarcity, wherein the meaning characteristics are determined in least in part from the metadata extracted object, and wherein the first sub-score, the second sub-score, or the third sub-score is determined from a portion of each of the plurality of datasets and the scoring is applied to a remainder of the plurality of datasets based on weighting factors;

creating a composite score that is a product of the first, second and third sub-scores;

creating a scored object from the composite score for each of the plurality of datasets;

creating and a plurality of data assets that each include a dataset of the plurality of datasets, the scored object for that dataset of the plurality of datasets, and the metadata extracted object for that dataset of the plurality of datasets creating, for each data asset, a certificate to comprise machine-readable integrity data, the certificate being automatically verifiable among multiple computing systems, including distributed systems, to ensure traceability, provenance, transparency, and authenticity of the dataset of each data asset, wherein the certificate is a data object independent of the dataset, and wherein the certificate includes the composite score of the dataset;

hashing the metadata extracted object to generate a unique identifier, wherein the unique identifier is included in the certificate to guarantee the composite score of the dataset;

appending the certificate for each data asset to each respective data asset, wherein the certificate includes pointers to the dataset, the metadata extracted object for that dataset, and the scored object; and recording the plurality of data assets and each certificate for each data asset in a secure database accessible to a plurality of computer systems.

* * * * *